United States Patent [19]

Kulesha et al.

[11] Patent Number: 5,069,318

[45] Date of Patent: Dec. 3, 1991

[54] SELF-STABILIZED STEPPED CRASHWORTHY STIFFENERS

[75] Inventors: Richard L. Kulesha; Michael D. Jones; Thomas E. Schmitt, all of Mesa, Ariz.

[73] Assignee: McDonnell Douglas Corporation, Long Beach, Calif.

[21] Appl. No.: 638,038

[22] Filed: Jan. 7, 1991

Related U.S. Application Data

[63] Continuation-in-part of Ser. No. 456,464, Dec. 26, 1989, abandoned.

[51] Int. Cl.⁵ .............................. F16F 7/12; B64C 1/00
[52] U.S. Cl. .................................. 188/377; 244/117 R
[58] Field of Search .............................. 188/376, 377; 244/117 R, 119; 248/548

[56] References Cited

U.S. PATENT DOCUMENTS

| 4,336,868 | 6/1982 | Wilson et al. | 188/376 |
| 4,377,370 | 3/1983 | Porcelli | 415/9 |
| 4,593,870 | 6/1986 | Cronkhite et al. | 244/117 R |
| 4,601,367 | 7/1986 | Bongers | 188/377 |
| 4,606,961 | 8/1986 | Munsen et al. | 428/119 |

FOREIGN PATENT DOCUMENTS 2196923 5/1988 United Kingdom ............... 244/119

*Primary Examiner*—Robert J. Oberleitner
*Attorney, Agent, or Firm*—Donald E. Stout; Gregory A. Cone; John P. Scholl

[57] ABSTRACT

A crushable, composite, columnar, self-stabilized structure for absorbing energy by progressively reacting compression forces along the axis of the structure. The compression failure initiates at one end and progresses to the second end of the stiffener in a controlled fashion in that at any cross section, the local compression strength at that point is less than the general stability strength of the remaining structure.

5 Claims, 3 Drawing Sheets

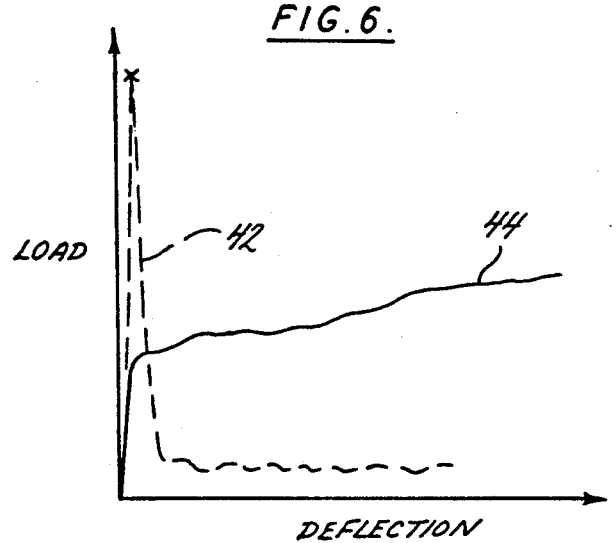
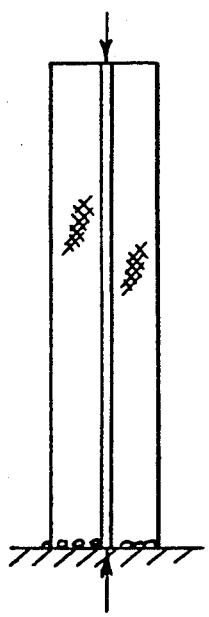
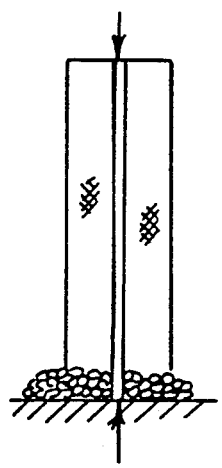
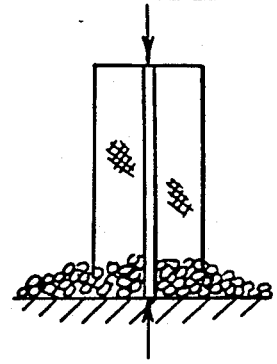
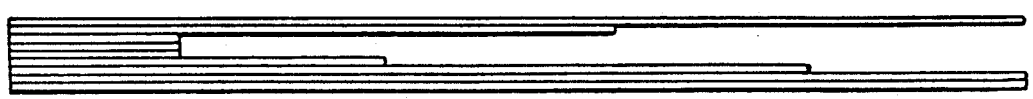

SELF-STABILIZED STEPPED CRASHWORTHY STIFFENERS

This is a continuation-in-part of application Ser. No. 456,464 filed on 26 December 1989, now abandoned.

BACKGROUND OF THE INVENTION

This invention relates to controlled energy absorption in crashworthy structures and more specifically aircraft and helicopter type structures made from composite materials.

Early helicopters were constructed with what is generally known as truss structure, i.e. a framework of longerons, running lengthwise, and struts, running up and down and crosswise, and both of which in turn, were strengthened by stringers. Monocoque structure uses a stressed skin outer shell which is strengthened with bulkheads and rings. Most helicopters today use a semimonocoque structure which is a combination of truss and stressed-shell construction. It is a stressed-shell reinforced by longerons and stiffeners for added strength. Any unstiffened plate or shell structure under compressive or shear loading is likely to have its load-carrying capability severely limited by the onset of structural instability. The weight-efficiency of these structures can generally be enhanced by the addition of an arrangement of stiffening members. Such a structural assembly can be designed to be unbuckled, or the skin elements can be allowed to buckle before the design or ultimate load is reached.

Stiffening members that are continuous will strain with the shell members and hence carry a portion of the load. By aligning the stiffeners along dominate load directions a more efficient structural arrangement is achieved. For this reason, it is common practice to run the stiffeners in a fuselage generally along the length of the structure.

The stiffeners themselves must be supported at intervals by transverse stiffening members to prevent their failure by column buckling. The transverse members serve to maintain the cross-sectional shape in shell structures and also resist crushing loads when bending curvatures are imposed. The entire stiffened structure, of course, must be checked to make sure that general instability does not occur. These stiffeners are generally oriented perpendicular to the stress skin outer shell. The design procedure that has been discussed so far is to accommodate in-flight, landing and take-off loads without any consideration of crash loads.

Modern helicopter design requires a maximum level of crashworthiness protection without adding undue weight or complexity to the air frame. The crashworthiness of a helicopter design is a systems approach in that the air frame, landing gear, stroking seats and fuselage crush zone all cooperate and combine together to provide survival deceleration rates and structural integrity throughout the crash. For instance some parts of the fuselage are designed to crush and thereby absorb energy while other parts carry the load from major mass items, e.g. the engine and gear box to the crushing structure. This particular invention is directed to the composite fuselage crush zone which must be capable of absorbing a given amount of energy as well as distributing the crushing so as not to induce acceleration effects due to additional pitching and rolling.

Earlier helicopters were made of all metal fuselages and even if the columns or stiffeners did not fail with maximum crushing efficiency the ductility of the metal allowed the various elements of the structure to cooperate and still produce a failure mechanism that was an effective energy absorber. In fact, many state of the art metal fuselages have proven crashworthy in service. However, the structurally efficient materials known as composites which employ organic polymers or resins reinforced with cloth fibers or rovings have very desirable mechanical and physical properties. The graphite composites, for instance, are extremely strong but inherently very brittle and exhibit nonprogressive failure characteristics. Metals absorb energy through plastic deformation but composite materials do not so deform. If not intentionally designed otherwise, failure of a composite vertical structural member resembles a classic Euler instability column failure with very little energy absorption. The secret is to make these structurally efficient materials fail progressively, in compression, and maintain stability throughout the crash for maximum energy absorption. In other words, the compression failure must begin at one end of the column and progress to the other end to get maximum stroke and energy absorption of the failed column. If this cannot be accomplished failure of the composite materials in compression absorbs energy, however, the organic polymer material is friable and when it fails in compression it disintegrates into very small particles, splinter like in nature.

The procedure is to first determine what structure is required to accommodate the flight loads, discussed earlier, then take that structure and change it, where required, to also provide maximum energy absorption in a crash type failure without adding undue weight.

One of the techniques used in the prior art to stabilize the stiffening members for crushing includes the incorporation of web elements to provide external support to stabilize the vertical stiffener as it crushes. The webs must stay attached to the stiffener throughout the crushing event. However, even if attachment is maintained, progressive crushing is not guaranteed but, at best, provides enough stability for some buckling to take place before the structure becomes unstable. Another means of keeping the crushed elements stable is to incorporate a core material as taught in U.S. Pat. No. 4,593,870 to Cronkhite et al. For this method to perform effectively, the core must be sufficiently thick in relationship to the length of the stiffener to ensure that the stiffener will remain stable regardless of where the compressive failures occur. Another method as taught by Wilson et al in U.S. Pat. No. 4,336,868 is to run a continuous filament wound tube used as an anvil to stabilize the structure. In all of these methods, a loss of all or part of the external stabilization significantly reduces the amount of energy that a given structure can absorb. Further, reliability, weight and, in the case of military aircraft, decontamination of these closed structures are factors that must also be taken into consideration.

It is an object of this invention to provide open stiffening elements from structurally efficient composite materials which fail progressively, maintaining stability throughout the crash stroke for maximum energy absorption without relying on other stabilizing elements that could come unattached during crushing and add substantial weight.

It is a further object of this invention to provide predictable and controllable energy absorption characteristics to conventional structural stiffener elements commonly used in the aircraft industry such as T, Z, C, hat and cruciform sections made from all fiberous reinforced composites.

SUMMARY OF THE INVENTION

In summary, the above objects are accomplished in a columnar stiffener made from composite materials which when subjected to compressive loads beyond ultimate produces an efficient, progressive, energy absorbing, crushing structure. The crushing of the column begins at one end and continues in a predictable progressive path to the other end. The columnar stiffener is self-stabilizing in that any portion of the stiffener remaining after the initial compressive failure has a local compressive strength that is always less than the overall stability strength.

In more complex applications the vertical stiffener members may be made from built-up sections suitably spaced and combined with a thin composite panel. The stiffener panels may run both longitudinally and transversely as required. In the preferred embodiment the self-stabilization is provided by multiple ply drop offs in order to create a predictable failure progression path in that the stiffener has a cross section that is constantly increasing in area in the steps of the plies from one end to the other. Where required, as in military applications to accomodate decontamination, the stiffening elements of this invention are made from conventional open stiffening sections such as channel sections, T-sections, Z-sections, cruciform sections or inverted hat sections and are made from an organic polymer or resin reinforced with fibers.

In a typical helicopter crashworthy application, the crushable zone is located between the bottom outer skin and the underside of the aircraft floor with the columnar stiffeners oriented vertically with the thickest cross section toward the underside of the floor while the thinnest cross section is oriented toward the inside of the belly skin so that during a crash load the failure initiates at the impact or skin end.

BRIEF DESCRIPTION OF THE DRAWINGS

In order that the invention may be better understood, a description of the invention is provided with reference to the general concept and an illustrative embodiment is shown, wherein:

FIG. 6 is a graph showing the relationship between crush zone load-deflection characteristics for conventional composite structures with and without the present invention;

FIG. 7a–7c is a diagrammatic illustration of the progressive compressive failure of the energy absorbing structure of this invention;

FIG. 8 is a view of a typical ply lay-up arrangement, shown before the resin impregnated plies are debulked and compressed together, but arranged as used for energy absorbing stiffeners;

DETAILED DESCRIPTION OF THE PREFERRED EMBODIMENT

Figure 1:
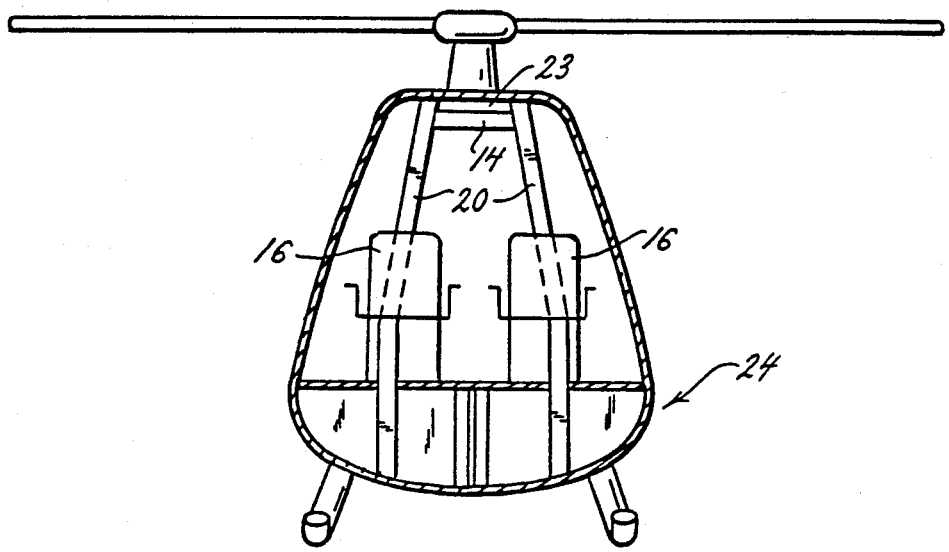
FIG. 1 is a diagrammatic view of the fuselage portion of a helicopter from the front side.
Figure 2:
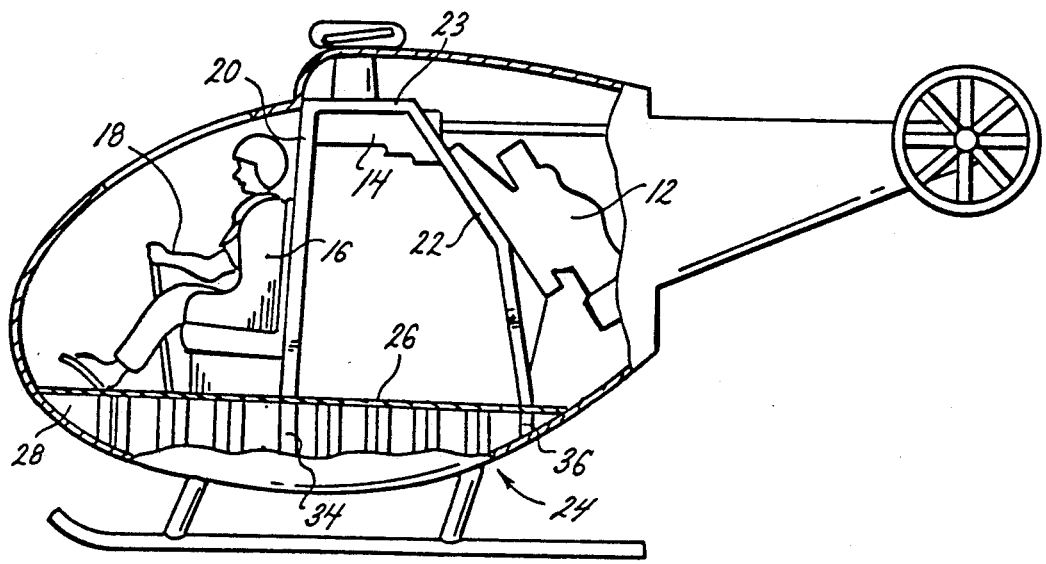
FIG. 2 is a diagrammatic view of the fuselage of a helicopter looking inboard from the left side.

FIGS. 1 and 2 are pictorial, diagrammatic representations of two views of a helicopter showing the items pertinent to this invention. The high mass items such as the engine(s) 12, transmission 14, seats 16, with occupants 18 are supported by vertical structural members generally shown at 20 and 22 which are shown connected by a box structure 23 at the top. This structure transmits the load from the heavy members to the crushable portion of the structure located in the crush zone 24 of the lower fuselage. The crush zone 24 is shown in greater detail in FIGS. 4 and 5 and is provided with composite crushable main structure in addition to smaller elements embodying the columnar stiffeners of the present invention. Most of the energy absorption in the fuselage crush zone 24 is due to vertical structural members and stiffeners. In order for these vertical members to absorb energy effectively they must remain stable throughout the crushing stroke. Without continuous lateral support, the end restraints of the columnar stiffeners are relied upon to keep the stiffeners and the structure in place during the crushing stroke. As the stiffener begins to crush, a local compression failure or crippling will occur. Location of this first failure is dependent on the material strength locally and the local and general stability modes.

Figure 3A:
FIG. 3a–d shows typical, classic Euler column failures which are the probable failure modes of composite columns not designed according to this invention.
Figure 3B:
Figure 3C:
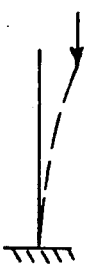
Figure 3D:
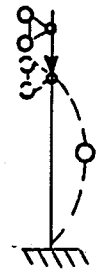

With a uniform local strength throughout the length, as in columns not using this invention, the first failure will occur at the maximum moment points of the general stability mode shape. The probable points of failure for various compressive stability mode shapes are shown in FIG. 3 with various column end restraints as shown in FIGS. 3a–3d. FIG. 3a shows end restraints at both ends in both rotation and translation and the probable failure sites are at either end or the center. FIG. 3b shows a column fully restrained at the base and partially restrained at the top with probable failure at the base or from mid-length to the top depending on the amount of rotation and translation permitted at the top. FIG. 3c shows restraint only at the base and failure would occur at the base. FIG. 3d shows translational restraint only at both ends of the column and failure would occur at mid-length. Most stiffening elements have some degree of fixity at both ends as indicated in FIG. 3a and the failure is likely to occur at either mid-length or either end. However, after the initial failure the problem becomes quite complex as several things can happen depending on the remaining end support conditions, the cross section size in relationship to the column, and the degree of weakening of the material around the failure. As an example, a column fixed at the top and bottom, as in FIG. 3a, might develop an initial failure at mid-length. Following this first failure the columns have one-half the initial length, both of which are fixed at one end and free at the opposite end. Depending on the degree of degradation of the material around the failure, the part could continue to crush or alternatively develop another failure at the base and become unstable and useless as an energy absorber.

Figure 4:
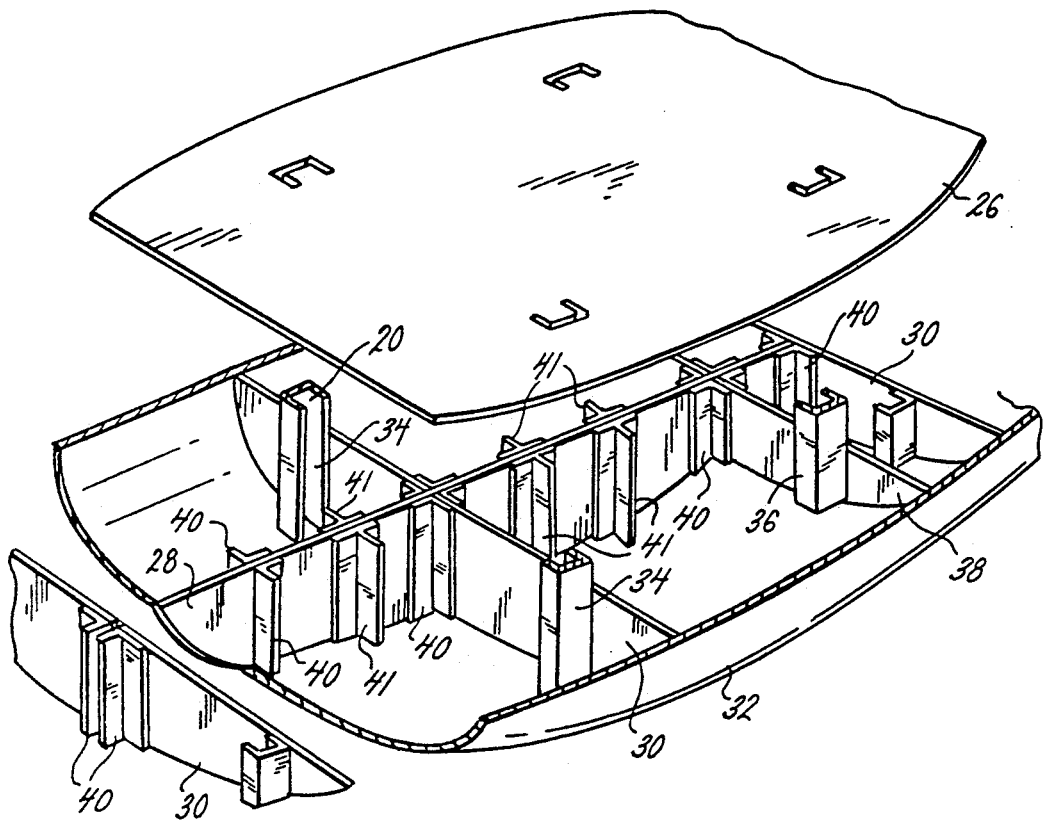
FIG. 4 is an exploded isometric view of the lower portion of a helicopter fuselage crush zone.

FIG. 4 is an exploded view of the fuselage crush zone 24 embodying this invention. The floor 26 is shown above the keel beam 28. Typically the beam 28, in either a helicopter or an aircraft extends the length of the fuselage. The beam is generally made up of caps and a relatively thin longitudinal web panel. Keel beam 28 is shown intersected by a bulkhead 30 and has a curved lower outer skin at 32. The vertical structures 20 and 22 terminate beneath the floor 26 as two channel section vertical structural member end portions 34 and 36 and are connected to bulkheads 30 and 38 respectively. Angle cross section stiffener elements 40 and T-section stiffener elements 41 are shown integrated along the length of the keel beam 28 and act as panel bulkhead attachment clips and breakers, respectively.

Figure 5:
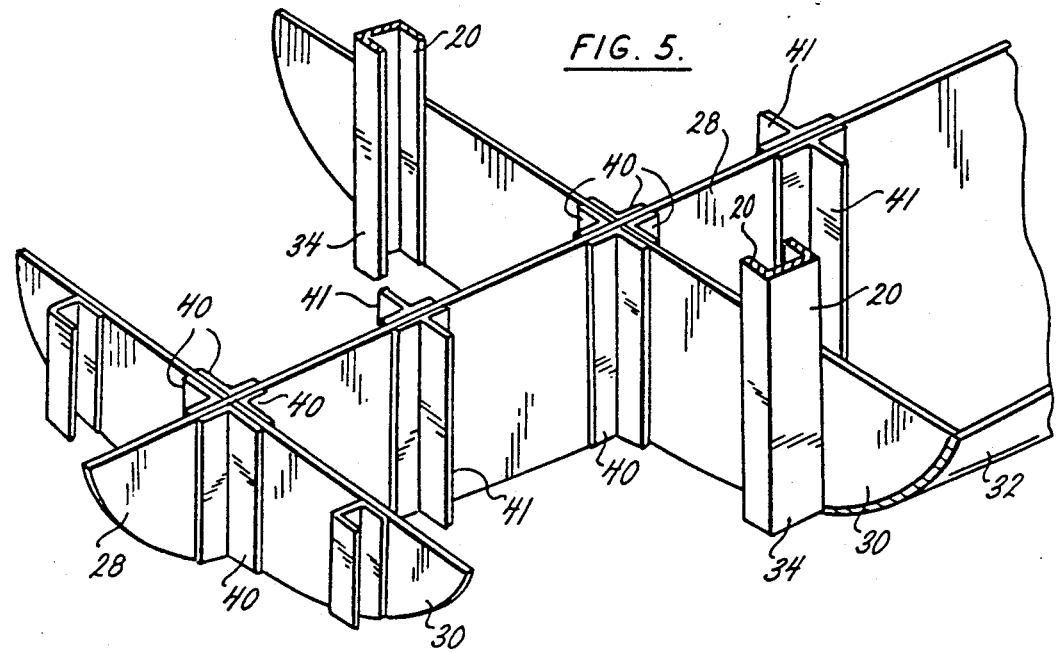
FIG. 5 is a prospective view of a typical stiffening structure using thin composite walls and composite stiffeners of the fuselage crush zone.

FIG. 5 is simply an enlarged view of the forward portion of the structure in the crush zone 24 just described and also shown in FIG. 4. The keel beam 28 and the bulkheads 30 and 38 are thin composite panels of constant thickness.

In order to prove this concept of self-stabilized graphite stiffening elements for dynamic energy absorption, multiple test specimens were prepared from a graphite woven fabric/epoxy system (Cellion 3K/Narmco 5225 TM) of channel sections, tapered channel sections, cruciform sections, "T" sections, "Z"-sections, and inverted hat sections. Various schemes for the ply drop-off were experimented with but there was little significant difference in the various schemes as long as the local crippling strength is less than the overall stability strength. The scheme shown in FIG. 8 was as good as any. This scheme shows the ply length drop off arrangement before the resin is applied and debulked and the plies are compressed together. After debulking and compression of the plies together a slight bump or step occurs at the ply drop-off and the resin flows such that there is a slight taper following the drop-off. Of course, the progression and pacing between the ply drop-offs must be such that, due to the change in thickness and the resulting reduction in cross section, the local compression strength at any cross section is less than the general stability strength of the remaining portion of the stiffener beginning at the thin end and progressing toward the thick end.

An alternate embodiment of the invention would be a tapered, thin core which could be made form a microballoon and resin pre-preg. For comparison purposes, specimens were also made where there was no ply drop-off so that there was no change in section modulus or area from one end of the stiffener to the other. These specimens were tested statically and dynamically. As generally anticipated, the constant cross section specimens failed at various places. However, some of the constant section specimens also failed progressively in an unpredictable, non-repeatable manner over portions of the length. Essentially all of the tapered thickness specimens failed first at the thinner free end and progressed until the tests were stopped at approximately twelve inches of stroke. The load stroke curves from the static test were used to predict the velocity history for the dynamic tests and the results were good indicating that the operating loads under dynamic and static conditions are similar. The constant area stiffeners did operate at higher load levels, as expected. However, when compared with their respective weights, the tapered thickness specimens utilizing ply drop-offs exhibited a higher specific energy absorption then their constant thickness counterparts. The cruciform section with the tapered cross-sectional area indicated a specific energy absorption well above that of the other section shapes. Of course, the load stroke curve for stiffeners with the tapering cross-sectional area exhibited an increase in load with stroke as the area in compression increased at the failure point.

The highest total energy absorption for a given stroke length and maximum load level, would be an element which crushed at that maximum load for its entire length or a constant cross-sectional area stiffener. However, as discussed infra, the stiffeners with constant cross-sectional area are unpredictable as energy absorbers due to their instability.

Also, a typical complex structure similar to that shown in FIG. 4 was drop tested using built-up section stiffeners that tapered in cross-sectional area from one end of the stiffener to the other and using constant section panels for the keel beam and bulkheads. The columnar stiffeners in the complex structure were made using ply drop-offs to produce the tapered cross-sectional area of this invention, and were oriented with the thickest cross section toward the fuselage floor 26 and the other end toward the belly skin 32. The result was a very impressive energy absorbing structure which failed progressively beginning at the small cross-sectional area end of the stiffener and progressing very rapidly to the thick end. The deceleration curve correlated closely to the prediction which was based on the sum of the static load-stroke curves.

The broken line curve 42 of FIG. 6 shows a typical load verses deflection curve for a helicopter crash with an inadequate or ineffective crush zone. The high peak load is generally the component of the crash that causes the greatest damage to the aircraft and the aircraft occupants. In accordance with the present invention, the controlled crushable structure, as taught herein, results in a curve as indicated at 44 which greatly reduces the peak load and reflects a very large area under the curve, indicating high energy absorption.

FIGS. 7a-7c are an attempt to show, pictorially, progressive failure of the self-stabilized stiffener of this invention. The reinforcing fibers of the composite are shown splintered.

FIG. 8 shows a typical section element, a C-channel, and the ply arrangement that was effective to produce the changing cross-sectional area from one end of the stiffener to the other.

The stiffeners described in the preceding discussion of the present invention provide an effective energy absorbing structure using tapered cross-sectional area stiffeners produced from composite materials.

What is claimed is:

1. In an aircraft, an energy absorbing structure made from an organic polymer reinforced with plies of fibers, comprising:

a columnar stiffener having first and second opposed ends and containing laminations of plies of said fibers having varying lengths so as to produce a stepped arrangement reducing the cross-sectional area in a series of steps from said first end to said second end, so that a self-stabilizing columnar stiffener results such that when said stiffener is subjected to compression loads so as to crush said stiffener, said crushing begins at said first end and progresses in a predictable fashion toward said second end and said stiffener has at any cross section between said first and second ends a local compression strength which is less than the general stability strength of the remaining portion of said stiffener from said cross section to said second end.

2. The energy absorbing structure of claim 1 wherein said columnar stiffeners are made from built-up sections and are oriented so that said stiffener is open so as to not trap contaminants.

3. The energy absorbing composite structure of claim 2 further comprising at least two columnar stiffeners in spaced relationship with a thin panel attached to said at least two columnar stiffeners.

4. The energy absorbing structure of claim 3 wherein said at least two columnar stiffeners are made from built-up elements symmetrically arranged on opposite sides of said thin panel.

5. The energy absorbing composite structure of claim 3 further comprising spaced upper and lower facing panels with said at least two columnar stiffeners oriented perpendicular to said facing panels and further oriented with said first end of said columnar stiffener against said facing panel exposed to the impact of said crushing.

* * * * *